March 10, 1942.  E. SIMS  2,275,692
AIRPLANE AILERON
Filed April 2, 1940  2 Sheets-Sheet 1
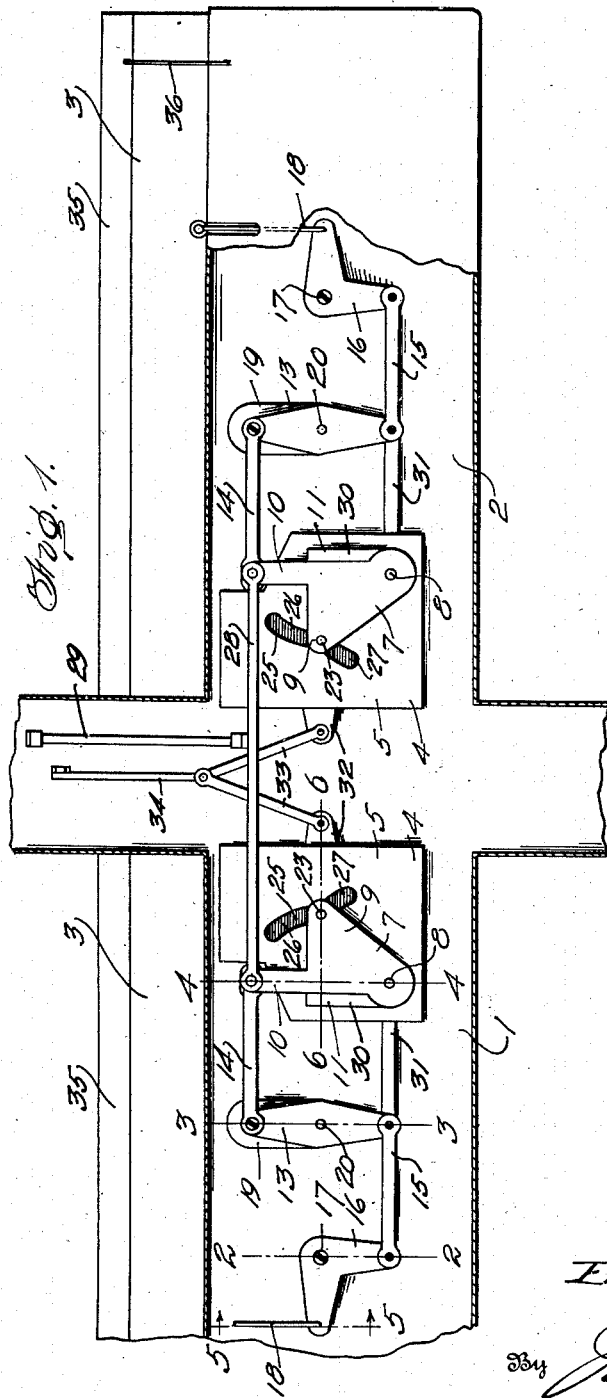
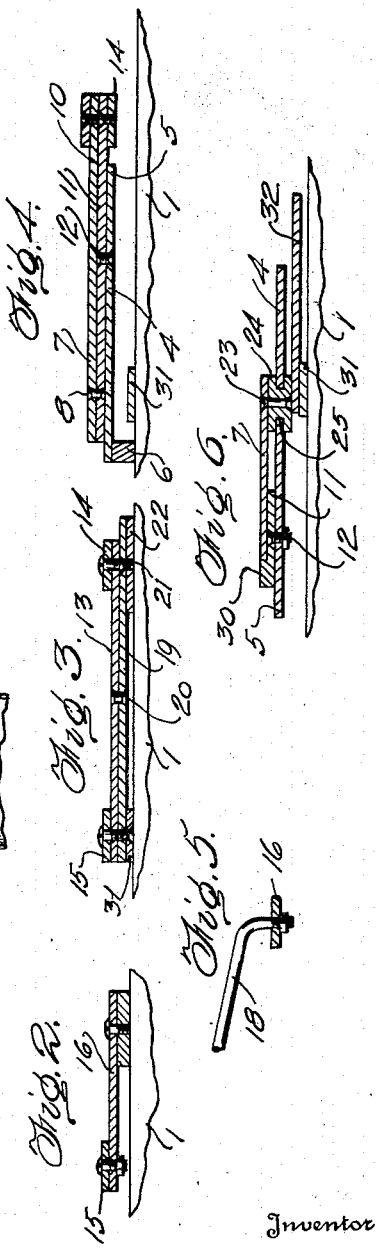
Inventor
Edward Sims
Attorney March 10, 1942.    E. SIMS    2,275,692
AIRPLANE AILERON
Filed April 2, 1940    2 Sheets-Sheet 2
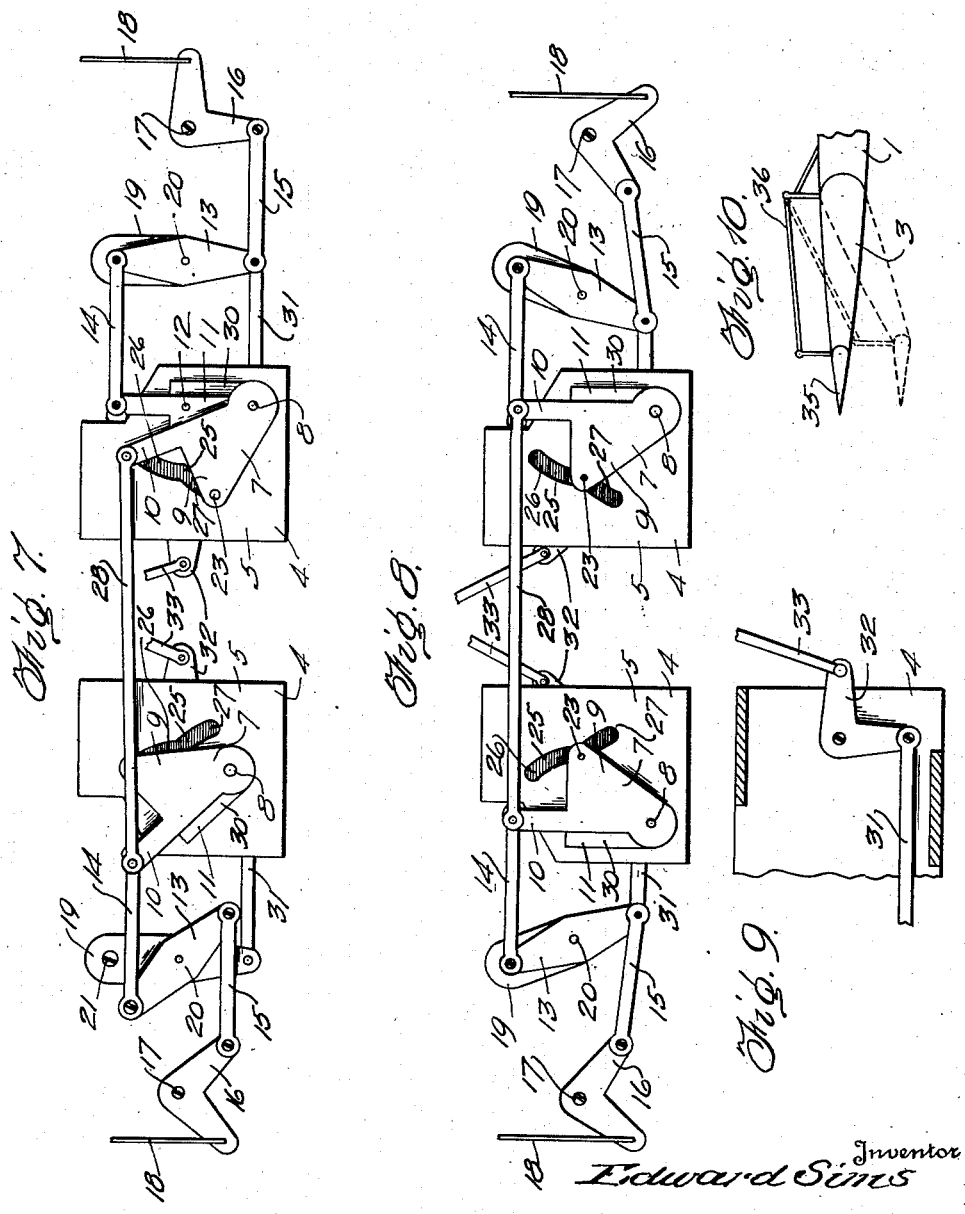
Edward Sims Inventor
Attorney Patented Mar. 10, 1942

2,275,692

UNITED STATES PATENT OFFICE 2,275,692

AIRPLANE AILERON

Edward Sims, Zanesville, Ohio

Application April 2, 1940, Serial No. 327,499

9 Claims. (Cl. 244—83)

This invention is directed to an improvement in airplanes and particularly to a control means for ailerons wherein the ailerons may be simultaneously and similarly operated to serve as brakes during landing or as elevators during take-off, or may be independently operated when in flight to control the balance of the airplane.

In airplane operation the ailerons perform an important function and may be utilized as brakes or to assist in take-off when the airplane is landing or leaving the landing field, and the ailerons are further largely utilized to assist in maintaining the balance of the airplane while in flight, by controlling the aileron of the individual wing as may be required.

Heretofore it has been usual and customary to provide for the independent control of the ailerons, which, while providing for an independent adjustment while in flight, requires two separate operations for controlling both the ailerons when landing or initial take-off.

The primary object of the invention is the provision of means whereby through the use of one of two separate levers the ailerons may be simultaneously or independently operated at will to ensure their proper functions at the particular time, the mechanisms being so correlated that unnecessary duplication and complication is avoided.

The invention is illustrated in the accompanying drawings, in which

Figure 1 is a plan view showing the wing portion of an airplane and the mechanism for controlling the ailerons in accordance with the present invention;

Figure 2 is a section on line 2—2 of Figure 1;

Figure 3 is a section on line 3—3 of Figure 1;

Figure 4 is a section on the line 4—4 of Figure 1;

Figure 5 is a section on the line 5—5 of Figure 1;

Figure 6 is a section on the line 6—6 of Figure 1;

Figure 7 is a view similar to Figure 1, showing mechanism for independently controlling one of the ailerons in operative relation and illustrating the fact that the remaining aileron has not been operated;

Figure 8 is a view similar to Figure 1, showing the ailerons simultaneously operated in response to the actuation of the mechanism for controlling this operation;

Figure 9 is a detail and elevation and partly in section illustrating the connection for one aileron in the simultaneous control mechanism, such detail being duplicated for the other aileron;

Figure 10 is a detail in elevation showing the use of a flap, the position of which is automatically controlled by the position of the aileron to avoid eddy currents at the free end of the aileron.

In connection with the following description it will be understood that both the independent and simultaneous control mechanisms are duplicated for each aileron, and that the following description which, for brevity will be limited to one aileron control, is duplicated for the other aileron control, and is to be so considered. The airplane may be, of course, of any usual or proved construction, involving for the purpose of the present invention, the provision of opposing wings 1 and 2, having ailerons 3 connected to the rear edges thereof in the usual manner. Mounted upon each wing adjacent the fuselage connection thereof is a housing 4 preferably formed as shown more particularly in Figure 4, as an upper platform or plate 5, held in spaced relation to the wing by bars 6.

Mounted on each platform 5 is an operating plate 7, the plate having a pin 8 which does not extend into or through the plate 5. The plate 7 has an extension 9 and a relatively narrow bar-like extension 10 at the end remote from the pivot. Immediately underlying the operating plate 7 is an auxiliary operating plate 11, the latter being supported on the pivot pin 8 and being itself connected by pivot pin 12 to the plate 5 of the housing. All is clearly shown in Figure 4.

The auxiliary plate 11 is connected remote from its connection with the plate 7 to one end of a beam 13 by a link 14, the opposite end of which beam is connected by a link 15 to one end of an angle lever 16, pivotally supported on the wing at 17 with the opposite end of such lever connected by a rod 18 to the aileron, so that the aileron may be operated by the movement of the angle lever. The beam 13 is supported on an auxiliary beam 19 through the medium of a pivot 20 arranged centrally of the beam 13. The auxiliary beam 19 is pivotally supported at 21 to a wing fixture 22.

An important detail of the present invention is the provision of means whereby the aileron controlling mechanism just described, and which, as stated, is duplicated for each aileron, may be selectively operated—that is, either aileron swung upwardly without correspondingly moving the other aileron, and to this end a construction is provided which in the selected operation of one aileron, will cause the operating plate of the mechanism of that aileron to move and operate the auxiliary operating plate of such mechanism, while at the same time the operating plate for the actuating mechanism of the other aileron will be moved independently of its cooperating auxiliary operating plate, and, therefore, not affect such other aileron. For this purpose the projecting portion 9 of each operating plate 7 has a depending pin 23 carrying a roller 24 peripherally undercut to seat in a guide channel 25 formed in the plate 5, and of particular shape. That portion of the channel 25 remote from the pivot pin 8 and indicated at 26 has a curvature concentric with the pivot pin 12 by which the auxiliary operating plate 11 is pivoted to the housing plate 5. The opposite end of the channel 25 which is indicated at 27 has a curvature which is concentric with the pivot pin 8. The roller 24, when the operating and auxiliary operating plates are in normal position, i. e., in superimposed relation, rests at the juncture of the parts 26 and 27 of the guide channel 25, and as in operation the roller moves in the portion 26 of the channel which is concentric to the pivot pin 12 of the auxiliary operating plate 11, both the main operating plate 7 and the auxiliary plate 11 may be moved. From the normal position, however, only the main operating plate 7 may be moved in the opposite direction, i. e., in the portion 27 of the guide channel 25.

As previously stated, the operating mechanisms described are duplicated for each wing and aileron and the extensions 10 of both operating plates 7 are connected by a tie rod 28 which is, in turn, connected to a manually operable rod 29 in reach of the pilot and which is so connected as to swing both main operating plates 7 in the same direction in any one operation.

The auxiliary operating plate 11 is provided with a stop 30 against which the edge of the main operating plate 7 bears to maintain the operating plates in normal superimposed relation when in normal position.

The operation of the selective means for the ailerons may be briefly described as follows:

Assuming it is desired to elevate the aileron shown at the left in Figure 1, the rod 29 is actuated to move the operating plate 7 of the left hand mechanism toward the left of the airplane as one faces forwardly. As the auxiliary operating plate 11 of this mechanism is pivotally mounted on a housing plate 5, and is connected at 8 to the end of the main operating plate, this movement of the main operating plate will swing the upper end of the auxiliary operating plate 11 towards the left, as the roller 24 moves in the portion 26 of the guide slot 25, and through the link 14 will move the main beam 13 to operate the bell crank lever 16 through the link 15 and swing the left hand aileron through the rod 18. The main operating plate 7 of the right hand aileron controlling mechanism is at the same time moved in the same direction as the left hand operating plate, but as the roller 25 is now moving in that portion 27 of the guide slot concentric with the pivot 8, the right hand operating plate will be moved without affecting the auxiliary operating plate, for the latter cannot move under this operation by reason of the eccentricity of the part 7 of the guide channel 25 to the pivot point 12, and through the further reason that link 14 abuts the edge of platform 5 holding the operating plate against the inoperative movement. Thus one aileron is operated to the exclusion of the other, the pilot being, of course, at complete freedom to select the operation of either aileron at will.

The invention also contemplates means by which both ailerons may be simultaneously and similarly operated through one mechanism. The end of each auxiliary beam 19 remote from its pivot 21 is connected by a link 31 to an angle lever 32 and pivotally supported in the housing 4 below the plate 5. The angle levers 32 are connected by links 33 to a single controlling lever 34, which lever 34 can simultaneously move the angle levers 32 in the same direction. As these levers are moved in the same direction, the links 31 actuate the free end of the auxiliary beams 19, and as the main beams 13 are connected to the auxiliary beams 19 by the pivot 20 and auxiliary beams are connected to the housing by a remote pivot 21, while at the same time the end of the main beam 13 overlying the pivot 21 of the auxiliary beam is held against movement by the link 14 of the individual aileron operating mechanism, the auxiliary and main beams 19 and 13 will be moved in the described operation of the links 31 to actuate the angle lever 16 and the connected ailerons. Of course, in this operation, both ailerons are simultaneously moved in the same direction and obviously may be moved upwardly or downwardly with respect to the wings of the airplane.

Small flaps 35 are pivotally connected to the ends of the ailerons and connected by links 36 forming the parallel motion so that in adjustment of the aileron, or ailerons, the flaps 35 will be moved to counteract eddy currents and direct a smoother action of the air currents with respect to the ailerons.

It is, of course, understood that as the wings are ordinarily constructed of double thickness having spaced upper and lower walls, the mechanism described may be obviously concealed between the walls, and it will be further apparent that the various parts may be constructed of light material or any material which has sufficient strength and will avoid adding materially to the weight of the airplane.

By the construction described, it is quite apparent that the pilot may, at will, operate both ailerons simultaneously and similarly in either direction, thus permitting them, when lowered, to serve as brakes in the landing of the airplane, or, when elevated, to serve in assisting the airplane in the take-off. Furthermore, the operator or pilot may independently raise either aileron at will to control the balance of the airplane.

What is claimed as new is:

1. An airplane having wings, ailerons connected thereto, means simultaneously moving the ailerons together in either similar direction relative to the wings, and means for selectively moving either one aileron upwardly and maintaining the other aileron against movement.

2. Means for operating the ailerons of an airplane including mechanism responsive to manual control for simultaneously operating the ailerons similarly and together in either direction relative to the wings, and means responsive to manual control for selectively operating a part of the simultaneously operating mechanism for raising either aileron at will while maintaining the other aileron against movement.

3. Mechanism for operating the ailerons of an airplane including an auxiliary beam connected to each aileron, bars connected to said auxiliary beam and manually operable means for simultaneously actuating the bars to move the ailerons similarly and together in either direction, main beams mounted on and operatively connected with the auxiliary beams and serving, when operated, to actuate in one direction the single aileron to which they are connected while maintaining the other aileron against movement, and manually operable means for selecting either of said main beams at will for operation.

4. A construction as defined in claim 3 wherein the means for operating the main beams includes an auxiliary operating plate mounted for pivotal movement and connected to the auxiliary beam, and a main operating plate connected to the auxiliary operating plate and responsive to manual movement, the main operating plate in movement in one direction actuating the auxiliary operating plate cooperating therewith and the connecting main beam, the movement of the main operating plate in the opposite direction holding its associated auxiliary plate against operation.

5. A construction as defined in claim 3 wherein the means for operating the main beams includes an auxiliary operating plate connected with the main beam and pivotally supported on a fixture relative to the wing, a main operating plate pivotally connected to the auxiliary operating plate at a point remote from the pivot of the auxiliary operating plate, means connecting the main operating plates for simultaneous movement in the same direction, each main operating plate in movement in one direction compelling movement of the auxiliary plate with which it cooperates, the said main operating plates in movement in the opposite direction holding its associated auxiliary plate against operation.

6. Mechanism for operating the ailerons of an airplane including a main beam connected to the aileron and operating it when the main beam is operated, an auxiliary operating plate pivotally supported on a fixture relative to the wing, and connected to the main beam, a main operating plate pivotally connected to the auxiliary operating plate at a point remote from the pivot of the latter, manually operable means connected to the main operating plate, and a guide slot controlling the movement of the main operating plate, said slot including a section concentric with the pivot between the main and auxiliary operating plates, and a section concentric with the pivot of the auxiliary operating plate.

7. A construction as defined in claim 6 including an auxiliary beam under-lying the main beam and pivotally supported at one end to a fixture relative to the wing, and an operating bar connected to the auxiliary beam at a point remote from its pivot.

8. Mechanism for operating the ailerons of an airplane including mechanism responsive to manual operation for moving the ailerons together and simultaneously in either direction, and means connected to said mechanism and in part responsive to selective movement to operate either one of said ailerons in one direction, the said means under selective movement being effective with respect to the movement of one aileron while maintaining the other aileron against movement.

9. A construction as defined in claim 8 wherein the means includes two operating plates connected together and with one of them having pivotal support in a fixture relative to the wing, and means whereby one of said plates in movement in one direction will compel a corresponding movement of the other of said plates, and a movement in the opposite direction will maintain the other of said plates against movement.

EDWARD SIMS.